United States Patent
Clingerman et al.

(10) Patent No.: US 8,168,343 B2
(45) Date of Patent: May 1, 2012

(54) HUMIDIFICATION CONTROL DURING SHUTDOWN OF A FUEL CELL SYSTEM

(75) Inventors: Bruce J. Clingerman, Palmyra, NY (US); Steven D. Burch, Honeoye Falls, NY (US); John P. Salvador, Penfield, NY (US); Manish Sinha, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 762 days.

(21) Appl. No.: 12/184,776

(22) Filed: Aug. 1, 2008

(65) Prior Publication Data

US 2010/0028728 A1    Feb. 4, 2010

(51) Int. Cl.
*H01M 8/04* (2006.01)
(52) U.S. Cl. ........ 429/429; 429/428; 429/430; 429/434; 429/444
(58) Field of Classification Search .......... 429/413, 429/428, 429, 430, 434, 444
See application file for complete search history.

(56) References Cited

U.S. PATENT DOCUMENTS

| | | | |
|---|---|---|---|
| 6,376,111 B1* | 4/2002 | Mathias et al. | 429/413 |
| 2004/0053092 A1* | 3/2004 | Kato et al. | 429/22 |
| 2006/0222924 A1* | 10/2006 | Matsuoka | 429/34 |
| 2006/0263654 A1* | 11/2006 | Goebel et al. | 429/13 |
| 2007/0026277 A1* | 2/2007 | Ogawa et al. | 429/22 |
| 2007/0087238 A1* | 4/2007 | Inai et al. | 429/24 |
| 2007/0138309 A1* | 6/2007 | Maier et al. | 236/44 R |
| 2008/0102326 A1* | 5/2008 | Falta | 429/13 |
| 2009/0305088 A1* | 12/2009 | Chowdhury | 429/13 |
| 2009/0305099 A1* | 12/2009 | Chowdhury et al. | 429/22 |

FOREIGN PATENT DOCUMENTS

| | | |
|---|---|---|
| CN | 101170185 A | 4/2008 |
| WO | WO 2006/095606 A1 | 9/2006 |

OTHER PUBLICATIONS

Pathapati et al., A new dynamic model for predicting transient phenomena in a PEM fuel cell system, Jan. 2005, Renewable Energy, 30, 1-22.*

* cited by examiner

*Primary Examiner* — Basia Ridley
*Assistant Examiner* — Sean P Cullen
(74) *Attorney, Agent, or Firm* — John A. Miller; Miller IP Group, PLC

(57) ABSTRACT

A process for controlling the length of a purge and the purge rate of a fuel cell stack at system shut-down so as to provide the desired amount of stack humidity. The membrane humidification is measured at system shut-down by a high frequency resistance sensor that detects membrane humidification and provides the measurement to a controller. The controller controls the compressor that provides cathode input air to the fuel cell stack so that the time of the purge and the flow rate of the purge provide a desired membrane humidity for the next start-up.

16 Claims, 1 Drawing Sheet

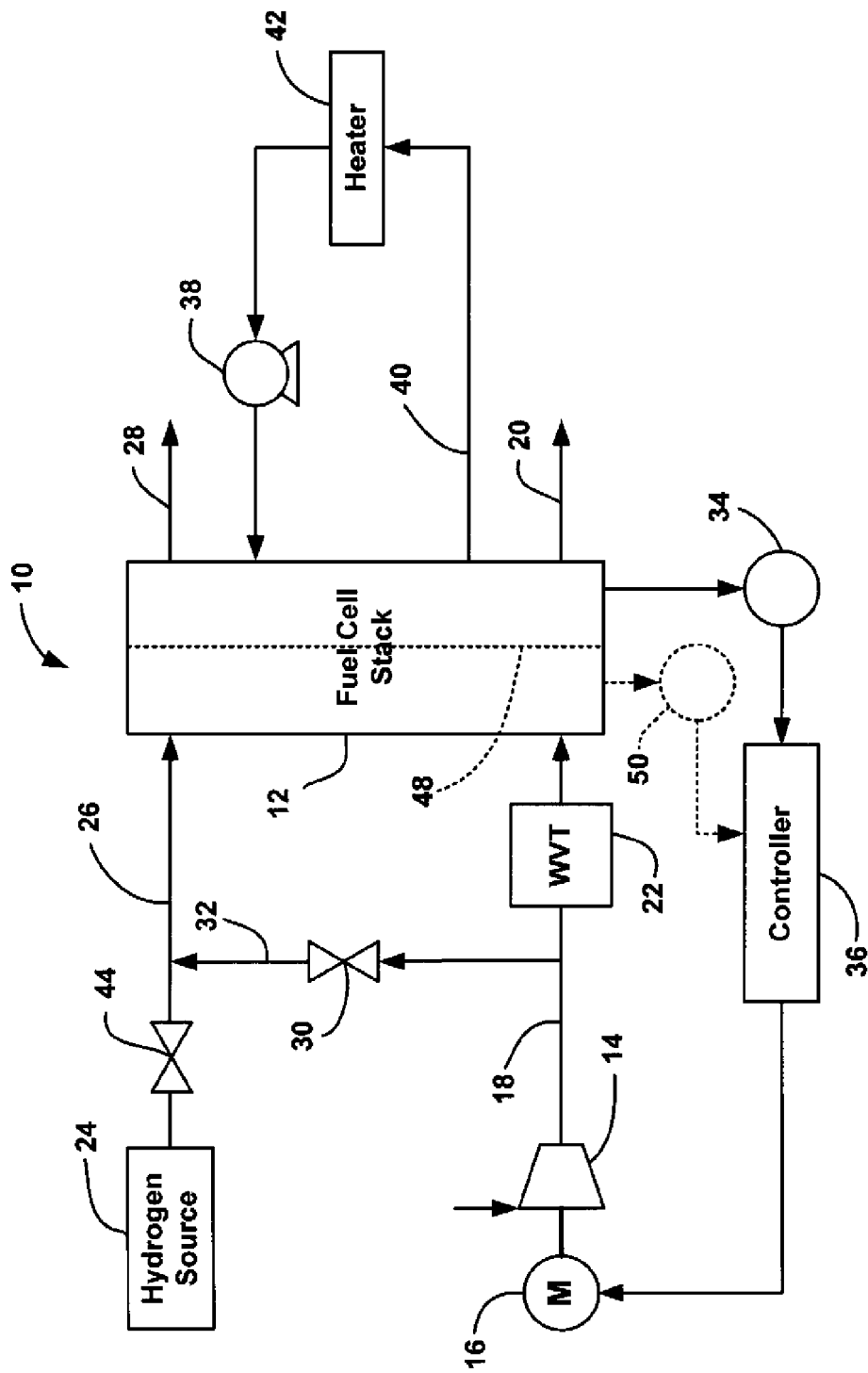

HUMIDIFICATION CONTROL DURING SHUTDOWN OF A FUEL CELL SYSTEM

BACKGROUND OF THE INVENTION

1. Field of the Invention

This invention relates generally to a process for controlling the relative humidity of membranes in a fuel cell stack during system shut-down and, more particularly, to a process for controlling the relative humidity of membranes in a fuel cell stack at system shut-down by using a high frequency resistance measurement that identifies stack relative humidity.

2. Discussion of the Related Art

Hydrogen is a very attractive fuel because it is clean and can be used to efficiently produce electricity in a fuel cell. A hydrogen fuel cell is an electrochemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

As is well understood in the art, fuel cell membranes operate with a certain relative humidity (RH) so that the ionic resistance across the membrane is low enough to effectively conduct protons. The relative humidity of the cathode outlet gas from the fuel cell stack has a strong influence over the membrane relative humidity. By holding a particular set-point for cathode outlet relative humidity, typically 80%, the proper stack membrane relative humidity can be maintained. Stack pressure, stack temperature, cathode stoichiometry and relative humidity of the cathode air into the stack are all controlled parameters to maintain relative humidity air outlet. For stack durability purposes, it is desirable to minimize the number of relative humidity cycles of the membrane because cycling between RH extremes has been shown to severely limit membrane life. Membrane RH cycling causes the membrane to expand and contract as a result of the absorption of water and subsequent drying. This expansion and contraction of the membrane causes pin holes in the membrane, which create hydrogen and oxygen cross-over through the membrane creating hot spots that further increase the size of the hole in the membrane, thus reducing its life.

As mentioned above, water is generated as a by-product of the stack operation. Therefore, the cathode exhaust gas from the stack will include water vapor and liquid water. It is known in the art to recover water from the cathode exhaust stream and return it to the stack via the cathode inlet airflow. Many devices could be used to perform this function, such as a water vapor transfer (WVT) unit.

Further, when the power request for the stack increases, the compressor speed increases to provide the proper amount of cathode air for the requested power. However, when the compressor speed increases, the flow of air through the WVT unit has a higher speed, and less of a chance of being humidified to the desired level. Also, in some fuel cell system designs, the relative humidity of the cathode inlet stream and/or the cathode exhaust stream can be controlled to maintain a set-point by adjusting the temperature of the cooling fluid flow.

It is known in the art to measure the relative humidity of the cathode air input to the fuel cell stack and the cathode exhaust gas output from the fuel cell stack using relative humidity sensors to provide humidity control. However, the cathode exhaust gas can often be at or above a 100% humidity level, especially during system warm-up. Available RH sensors typically do not perform well when measuring relative humidity above 100%, especially if they need to then measure relative humidity below 100% soon afterwards.

During fuel cell system shut-down, it is desirable that the membranes have a certain amount relative humidity so they are not too wet or too dry. A membrane that is too wet may cause problems for low temperature environments where freezing of the water in the fuel cell stack could produce ice that blocks flow channels and affects the restart of the system. Therefore, it is known in the art to purge the flow channels in the fuel cell stack, typically using compressor air from the compressor to purge either the cathode or the cathode and the anode of the stack. However, too long of a purge could cause the membranes to become too dry where the membranes will have too low of an electrical conductivity at the next system restart that affects restart performance as well as reduces the durability of the stack.

The operating conditions of the fuel cell system just prior to shut-down have a significant effect on the amount of water in the fuel cell stack. For example, if the stack is running relatively cold, such as 60° C., because of low stack power demand and/or cold ambient conditions, then RH control of the stack is fairly straight-forward during shut-down where the system target RH levels can be met, typically 55% into the stack and 80% out of the stack. For higher temperature shut-downs, the system may be running at lower RH levels because of the inability to maintain the target RH. For example, in warmer ambient conditions at high loads, the WVT unit may not be able to meet the desired RH levels.

For a desirable freeze start-up, the system should have previously been shut-down to a consistent level of membrane humidification despite the operating conditions prior to shut-down. In order to achieve the correct shut-down, despite the operating conditions, it is essential to close loop on a measurement of membrane humidification. It would be easier to shut-down with open loop control by providing a specific purge rate and time for every shut-down. Unfortunately, such an open loop control cannot adjust for the different conditions prior to the shut-down.

SUMMARY OF THE INVENTION

In accordance with the teachings of the present invention, a process for controlling the length of a purge and the purge rate of a fuel cell stack at system shut-down is disclosed so as to provide the desired amount of stack humidity. The membrane humidification is measured at system shut-down by a high frequency resistance sensor that detects membrane humidification and provides the measurement to a controller. The controller controls a compressor that provides cathode input air to the fuel cell stack so that the time of the purge and the flow rate of the purge provide a desired membrane humidity for the next start-up.

Additional features of the present invention will become apparent from the following description and appended claims, taken in conjunction with the accompanying drawings.

BRIEF DESCRIPTION OF THE DRAWING

FIG. 1 is a schematic block diagram of a fuel cell system employing a process for determining the duration and flow rate of a stack purge based on relative humidity measurements at system shut-down, according to an embodiment of the present invention.

DETAILED DESCRIPTION OF THE EMBODIMENTS

The following discussion of the embodiments of the invention directed to a process for controlling a purge of a fuel cell stack at system shut-down is merely exemplary in nature and is in no way intended to limit the invention or its applications or uses.

FIG. 1 is a schematic block diagram of a fuel cell system 10 including a fuel cell stack 12. The fuel cell stack 12 may be split into sub-stacks, which is represented by dashed line 48. The system 10 also includes a compressor 14 driven by a motor 16 that provides a cathode inlet airflow on cathode input line 18 to the stack 12. A cathode exhaust gas is output on a cathode exhaust gas line 20. A water vapor transfer (WVT) unit 22 is provided in the cathode input line 18 to humidify the cathode airflow in a manner that is well understood to those skilled in the art. Although not specifically shown, the moisture for the WVT unit 22 would typically be provided by the cathode exhaust gas. A hydrogen source 24 provides fresh dry hydrogen to the anode side of the fuel cell stack 12 on anode input line 26, where an anode exhaust gas is output from the stack 12 on anode exhaust gas line 28.

The fuel cell system 10 also includes a thermal sub-system for controlling the temperature of the fuel cell stack 12. Particularly, a cooling fluid pump 38 pumps a cooling fluid through a coolant loop 40 outside of the fuel cell stack 12 and cooling fluid flow channels within the fuel cell stack 12. A heater 42 is provided to heat the cooling fluid at certain times when it is desirable to raise the temperature of the fuel cell stack 12.

During shut-down of the system 10, the cathode and anode flow channels in the fuel cell stack 12 are purged to remove excess water therein and provide a stack relative humidity suitable for the next system start-up. In order to provide this purge, a purge valve 30 is provide in a purge line 32 connecting the cathode input line 18 to the anode input line 26 so that air from the compressor 14 can be directed to both the cathode and anode flow channels in the fuel cell stack 12 when the valve 30 is open. The hydrogen source 24 is closed off by valve 44 during the purge.

Alternately, the compressor 14 can be used to purge only the cathode side of the stack 12. Some dry-out of the anode side will occur due to the membrane's permeability.

As discussed above, it is generally necessary to control the stack humidity so that the membranes in the stack 12 have the proper electrical conductivity, but there is not enough water remaining in the stack 12 where the flow channels can become blocked by ice if the water freezes. One technique for measuring membrane humidification is referred to in the art as high frequency resistance (HFR) humidification measuring. HFR humidification measurements are generated by providing a high frequency component on the electrical load of the stack 12 so that a high frequency ripple is produced on the current output of the stack 12. The resistance of the high frequency component is then measured by a detector, which is a function of the amount of water in the stack 12.

The present invention proposes using high frequency resistance (HFR) measurements at system shut-down to control the duration and flow rate of the air purge of the fuel cell stack 12. By knowing the humidity of the stack 12 fairly accurately, the purge can be controlled so that the desired level of humidity of the membranes after system shut-down can be obtained.

In order to provide the high frequency resistance measurements, the fuel cell system 10 includes a sensor 34 for measuring the resistance of the high frequency component on the stack output, which is provided to a controller 36. For a fuel cell stack system 10 that employs split sub-stacks, the sensor 34 is used to measure the resistance of the high frequency component of one sub-stack and a sensor 50 is used to measure the resistance of the high frequency component of the other sub-stack. The controller 36 converts the resistance measurement to a representative value identifying the humidity level in the stack 12 by known calculations. The controller 36 then controls the motor 16 to control the speed of the compressor 14 and the duration of the purge of the fuel cell stack 12 at system shut-down.

In certain fuel cell systems, such as anode flow/switching fuel cell systems, two fuel cell sub-stacks are employed. Thus, the HFR measurement can be different for the two sub-stacks. There are various options for the closed loop control of the invention that is described above for separate sub-stacks. For example, the end of the purge shut-down could be triggered on the average HFR measurement between the two sub-stacks reaching a threshold, for example where the higher the HFR measurement, the lower the membrane relative humidity. Such thresholds could be on the order of 150-400 $m\Omega\text{-}cm^2$, or lower or higher, depending on the stack water holding characteristics. If the sub-stacks are fairly balanced, an under-drying of the membrane is more critical than an over-drying of the membrane, thus the HFR measurement threshold could be based on the minimum of the two sub-stacks reaching an HFR set-point. If over-drying is critical, a maximum of the two measurements reaching a threshold may be appropriate.

Another option is to look for a slow change of the HFR measurement. HFR measurements have been characterized as moving up fairly flat, and then hooking up sharply. In this case, the slope change can trigger the end of the purge, or at least a reduction of airflow to ensure that the stack will not be over-dried as the compressor spools down.

The system 10 may also have water at shut-down in places that are not tolerant of ice. An example would be a cathode exhaust back pressure valve. Ice can form on the valve blade, freezing the valve shut, and causing a no start condition for the next start-up. If the system needs a minimum time for airflow to push water away, then these criteria should affect the shut-down time. If the system time exceeds the stack over-dry threshold, the system can drop the cooling fluid temperature using a thermostat to slow down the drying rate of the membrane. This will dry the system without over-drying the stack membranes.

Another key feature to the shut-down purge is RH control. If dry air enters the stack 12 during the shut-down air purge, the cathode-in portion of each cell may be over-dried, while the cathode-out portion may still be too wet. To get good RH balance across the entire cell, the stack humidification sub-system control should control stack RH to maintain even RH distribution across each fuel cell. To achieve this, a water buffer model can be used to predict the membrane RH across the cells. Using this model and experimental data, the preferable inlet RH during purge has been determined to be 20% to 40%.

The rate of water removal from the membrane is strongly driven by airs ability to take up and hold water, which is a function of temperature and pressure. One heuristic is that fuel cell temperature should exceed 50° C. for an effective purge.

For very short trips, such as under 2 minutes, particularly if the stack was cold at key-on, the stack temperature may be well below 50° C. at key-off. In these cases, the stack 12 must be heated up to enable an effective shut-down purge.

Several approaches are possible to warming up the stack at key-off. In many cases, the fuel cell system will have features such as an electric coolant heater or a device for sending hydrogen to the cathode inlet that are used to facilitate warming of the stack during freezing conditions. These same devices can be turned on at system shut-down to bring the stack temperature up to a minimum temperature, such as 50° C. One controlled approach would be to bring the temperature up to its minimum value prior to initiating the purge.

An alternate to sequential control would be to perform the stack warm-up at the same time as the stack purge, thus reducing the overall shut-down time. In this case, if at any time the HFR criteria is met, both warm-up and purge ends, but if a temperature set-point is met before the HFR set-point is met, the stack warm-up command stops, but the purge air flow continues.

In either case, a maximum shut-down time criteria may be needed to prevent excessive run-on after key-off that would negatively impact fuel usage and range, particularly with a faulty HFR reading.

Another method to protect against faulty HFR measurements is to have a dynamic membrane humidification model embedded in the on-vehicle controls. Such a model could provide an independent prediction of the membrane humidification level and HFR measurement, and provide a backup to the HFR measurement.

Further, another way to minimize run-on time and associated fuel use due to the shut-down purge is to only perform a full purge when the next start-up is reasonably feasible to be under freezing conditions. Although this is difficult to know for certain, use of a GPS and/or weather forecasts could provide adequate assurances. For example, for vehicles in the southern part of the United States a full shut-down purge to protect against freeze would not be required from June through September especially if the 10-day forecast showed minimum temperatures above 15° C.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
a fuel cell stack;
a compressor for providing cathode inlet air to a cathode side of the fuel cell stack and purge air to both an anode side and the cathode side of the fuel cell stack;
at least one high frequency resistance measurement device for measuring the resistance of a high frequency component on an electrical load of the stack; and
a controller configured to use the resistance measurement to identify an amount of humidity in the fuel cell stack at system shut-down, said controller further configured to control the compressor during a stack purge based on the measurement from the high frequency resistance measurement device, wherein the controller ends the stack purge when the high frequency resistance measurement is greater than a threshold.

2. The system according to claim 1 wherein the fuel cell stack is split sub-stacks and the at least one high frequency resistance measurement device is one high frequency resistance measurement device for each sub-stack, each high frequency resistance measurement device measuring the resistance of a high frequency component for a separate one of the sub-stacks.

3. The system according to claim 2 wherein the controller ends the stack purge when an average high frequency resistance measurement of the sub-stacks reaches a predetermined threshold.

4. The system according to claim 2 wherein the controller ends the stack purge when a minimum high frequency resistance measurement of one of the sub-stacks reaches a predetermined threshold.

5. The system according to claim 2 wherein the controller ends the stack purge when a maximum high frequency resistance measurement of one of the sub-stacks reaches a predetermined threshold.

6. The system according to claim 1 wherein the controller ends the stack purge when a changing slope of the high frequency resistance measurement reaches a predetermined slope.

7. The system according to claim 1 where the controller controls stack temperature during the stack purge.

8. The system according to claim 1 further comprising a heater for heating the stack during the stack purge.

9. The system according to claim 1 wherein the controller employs a dynamic membrane humidification model in combination with the high frequency resistance measurements to determine stack purge duration.

10. The system according to claim 1 wherein the controller employs a water buffer model to determine humidification across fuel cell membranes in combination with the high frequency resistance measurements to determine stack purge duration.

11. A fuel cell system comprising:
a fuel cell stack;
a compressor for providing cathode inlet air to a cathode side of the fuel cell stack and purge air to both an anode side and the cathode side of the fuel cell stack; and
a controller configured to use an amount of humidity in the fuel cell stack at system shut-down to control a purge duration and a purge rate by the compressor during a stack purge, wherein the controller uses a high frequency resistance measurement of a high frequency component on an electrical load of the stack to determine stack relative humidity at system shut-down, and wherein the controller ends the stack purge when the high frequency resistance measurement reaches a target set-point.

12. The system according to claim 11 further comprising a heater for heating the stack during the stack purge.

13. A method for determining a fuel cell stack purge rate and duration at fuel cell system shut-down, said method comprising:
measuring the resistance of a high frequency component on an electrical load of the stack; and
controlling a compressor during a stack purge based on the high frequency component measurement to control purge air sent to a cathode and an anode of the fuel cell stack so that membranes within the stack have a desired relative humidity at the system shut-down, wherein the stack purge is ended when the high frequency resistance measurement reaches a target set-point.

14. The method according to claim 13 further comprising heating the stack during the stack purge.

15. The method according to claim 13 further comprising employing a dynamic membrane humidification model in combination with the high frequency resistance measurements to determine stack purge duration.

16. The method according to claim 13 further comprising employing a water buffer model to determine humidification across fuel cell membranes in combination with the high frequency resistance measurements to determine stack purge duration.

* * * * *